US012719222B2

(12) United States Patent
Bulduk et al.

(10) Patent No.: US 12,719,222 B2
(45) Date of Patent: Aug. 25, 2026

(54) SHIELDING SPRING CONTACT, PLUG-IN CONNECTOR COMPRISING A SHIELDING SPRING CONTACT, CABLE SHIELD CONNECTION AND PLUG-IN CONNECTOR SYSTEM COMPRISING A SHIELDING SPRING CONTACT

(71) Applicant: TE Connectivity Germany GmbH, Bensheim (DE)

(72) Inventors: Uemit Bulduk, Bensheim (DE); Jochen Fertig, Bensheim (DE); Kevin Scheer, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 346 days.

(21) Appl. No.: 18/355,742

(22) Filed: Jul. 20, 2023

(65) Prior Publication Data

US 2024/0030659 A1 Jan. 25, 2024

(30) Foreign Application Priority Data

Jul. 22, 2022 (DE) ......................... 102022118421.8

(51) Int. Cl.
*H01R 13/6592* (2011.01)

(52) U.S. Cl.
CPC ................................ *H01R 13/6592* (2013.01)

(58) Field of Classification Search
CPC .......................... H01R 13/6592; H01R 13/658
(Continued)

(56) References Cited

U.S. PATENT DOCUMENTS 5,180,316 A 1/1993 Miller et al.
5,267,878 A * 12/1993 Shinji .............. H01R 13/65914 439/98
(Continued)

FOREIGN PATENT DOCUMENTS

DE 102012105258 A1 4/2015
EP 3251173 A1 5/2021
(Continued)

OTHER PUBLICATIONS

Korean Office Action dated Oct. 14, 2024 with English translation, corresponding to Application No. 10-2023-0095196, 6 pages.
(Continued)

*Primary Examiner* — Hae Moon Hyeon
(74) *Attorney, Agent, or Firm* — Barley Snyder

(57) ABSTRACT

A shielding spring contact for an electrical plug-in connector for an electrical plug-in connector system includes a sleeve-shaped main body having a cylindrical base portion, a conical shielding portion, and a plurality of passage openings by which the shielding spring contact is arranged on a cable of the electrical plug-in connector. The shielding spring contact is connectable to a braid of the cable via the cylindrical base portion by a crimp connection. The conical shielding portion has a plurality of apertures extending along a longitudinal direction of the shielding spring contact and is elastically deformable. The shielding spring contact is contactable with an assembly housing of a cable shield connection of the plug-in connector system via the conical shielding portion. A current of the braid can be diverted to the assembly housing via contact between the conical shielding portion and the assembly housing.

19 Claims, 7 Drawing Sheets

(58) Field of Classification Search
USPC .............................. 439/607.5, 607.41, 95, 98
See application file for complete search history.

(56) References Cited

U.S. PATENT DOCUMENTS

| | | | | |
|---|---|---|---|---|
| 5,725,387 | A | 3/1998 | O'Sullivan et al. | |
| 5,938,475 | A * | 8/1999 | Penner ............... | H01R 13/6582 439/98 |
| 6,152,745 | A * | 11/2000 | Matsumoto .......... | H01R 9/0524 439/98 |
| 6,376,766 | B1 * | 4/2002 | Bartholoma ....... | H01R 13/5816 174/359 |
| 8,858,261 | B2 * | 10/2014 | Bauerle ................ | H01R 9/0527 439/607.41 |
| 9,362,631 | B2 | 6/2016 | Listing et al. | |
| 10,355,399 | B2 | 7/2019 | Henzler | |
| 10,978,223 | B1 | 4/2021 | Wrighton | |
| 11,245,231 | B2 | 2/2022 | Hamner et al. | |
| 2002/0094724 | A1 * | 7/2002 | Saito ................ | H01R 13/65912 439/607.41 |
| 2006/0105632 | A1 | 5/2006 | Szczesny et al. | |
| 2015/0099397 | A1 * | 4/2015 | Listing ................... | H01R 4/646 439/607.41 |
| 2015/0140850 | A1 | 5/2015 | Suzuki et al. | |
| 2021/0273364 | A1 * | 9/2021 | Listing ................. | H01R 13/187 |
| 2022/0255267 | A1 * | 8/2022 | Fertig ................ | H01R 13/6581 |
| 2022/0336974 | A1 * | 10/2022 | Veihl ...................... | H01R 13/03 |

FOREIGN PATENT DOCUMENTS

| | | | |
|---|---|---|---|
| JP | 2018010720 | A | 1/2018 |
| JP | 2018529191 | A1 | 10/2018 |

OTHER PUBLICATIONS

Extended European Search Report dated Dec. 7, 2023, corresponding to Application No. 23186716.9-1201, 7 pages.
German Office Action dated Mar. 16, 2023 corresponding to App No. 10 2022 118 421.8, 9 pages.
Indian Office Action dated Mar. 24, 2026, corresponding to Application No. 202344048409, 6 pages.

* cited by examiner

SHIELDING SPRING CONTACT, PLUG-IN CONNECTOR COMPRISING A SHIELDING SPRING CONTACT, CABLE SHIELD CONNECTION AND PLUG-IN CONNECTOR SYSTEM COMPRISING A SHIELDING SPRING CONTACT

CROSS-REFERENCE TO RELATED APPLICATION

This application claims the benefit of the filing date under 35 U.S.C. § 119(a)-(d) of German Patent Application No. 102022118421.8, filed on Jul. 22, 2022.

FIELD OF THE INVENTION

The present invention relates to a shielding spring contact, a plug-in connector comprising a shielding spring contact, a cable shield connection and a plug-in connector system comprising a shielding spring contact.

BACKGROUND

Plug-in connector systems which have a shielding system designed to allow shielding currents to flow are known from the prior art. Shielding currents can be capacitively or inductively coupled into a shield when high-frequency electric currents flow through an electrical conductor. If a first plug-in connector of a plug-in connector system is integrated, for example, into a conductive housing of an assembly, shielding currents can be conducted to a housing wall of the housing.

For this purpose, the housing wall typically has a hollow-cylindrical dome which is arranged in the region around a cutout in the housing wall. Such a dome on the housing wall can be produced by a die-casting process. The dome is intended to shield an electrical conductor arranged in the cutout and to divert shielding currents.

Apart from complicated production of the housing, safe electrical contacting between the dome and a shielding structure of the second plug-in connector may additionally require machining of the dome.

SUMMARY

A shielding spring contact for an electrical plug-in connector for an electrical plug-in connector system includes a sleeve-shaped main body having a cylindrical base portion, a conical shielding portion, and a plurality of passage openings by which the shielding spring contact is arranged on a cable of the electrical plug-in connector. The shielding spring contact is connectable to a braid of the cable via the cylindrical base portion by a crimp connection. The conical shielding portion has a plurality of apertures extending along a longitudinal direction of the shielding spring contact and is elastically deformable. The shielding spring contact is contactable with an assembly housing of a cable shield connection of the plug-in connector system via the conical shielding portion. A current of the braid can be diverted to the assembly housing via contact between the conical shielding portion and the assembly housing.

BRIEF DESCRIPTION OF THE DRAWINGS

The invention is explained in more detail below with reference to schematic figures, of which.

DETAILED DESCRIPTION OF THE EMBODIMENT(S)

Figure 1A:
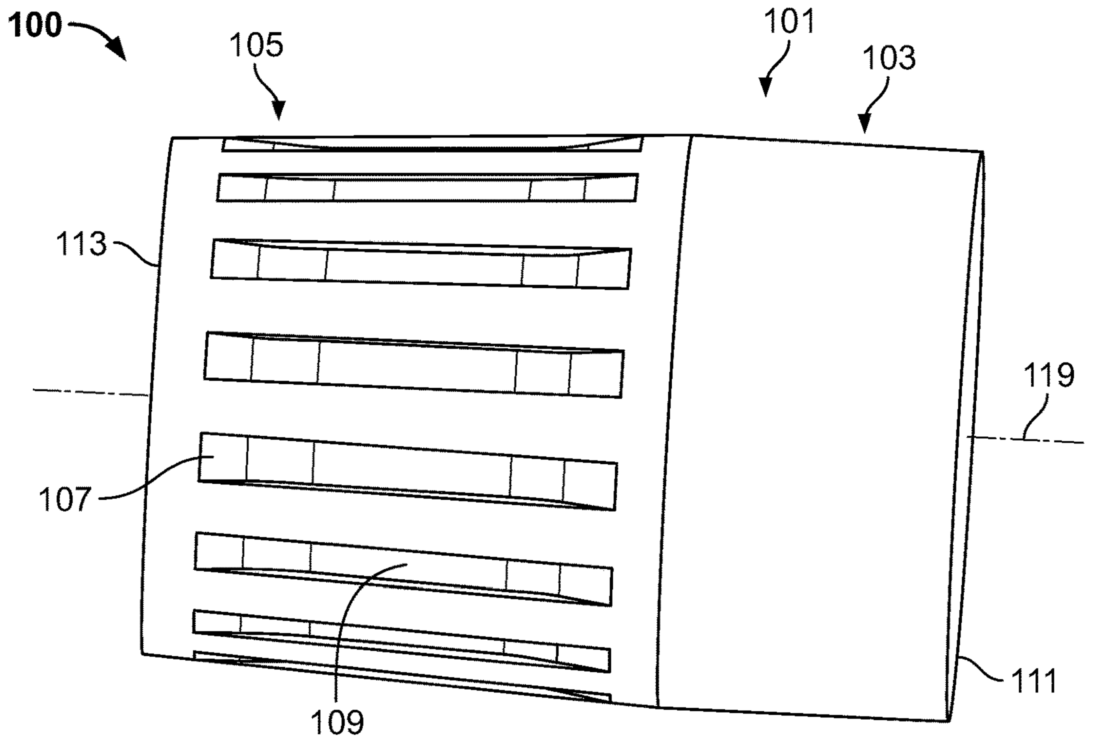
FIGS. 1A-1E are schematic illustrations of a shielding spring contact according to various embodiments.

FIG. 1A-1E shows a schematic illustration of a shielding spring contact 100 according to various embodiments. The various embodiments of the shielding spring contact 100 are described with reference to the plug-in connector 200 and the cable shield connection 300 according to the embodiments shown in FIGS. 2 to 6.

The shielding spring contact 100 has a sleeve-shaped main body 101 with a cylindrical base portion 103 and a conical shielding portion 105. The sleeve-shaped main body 101 has two passage openings 111, 113 arranged opposite one another along a longitudinal direction 119.

Figure 2:
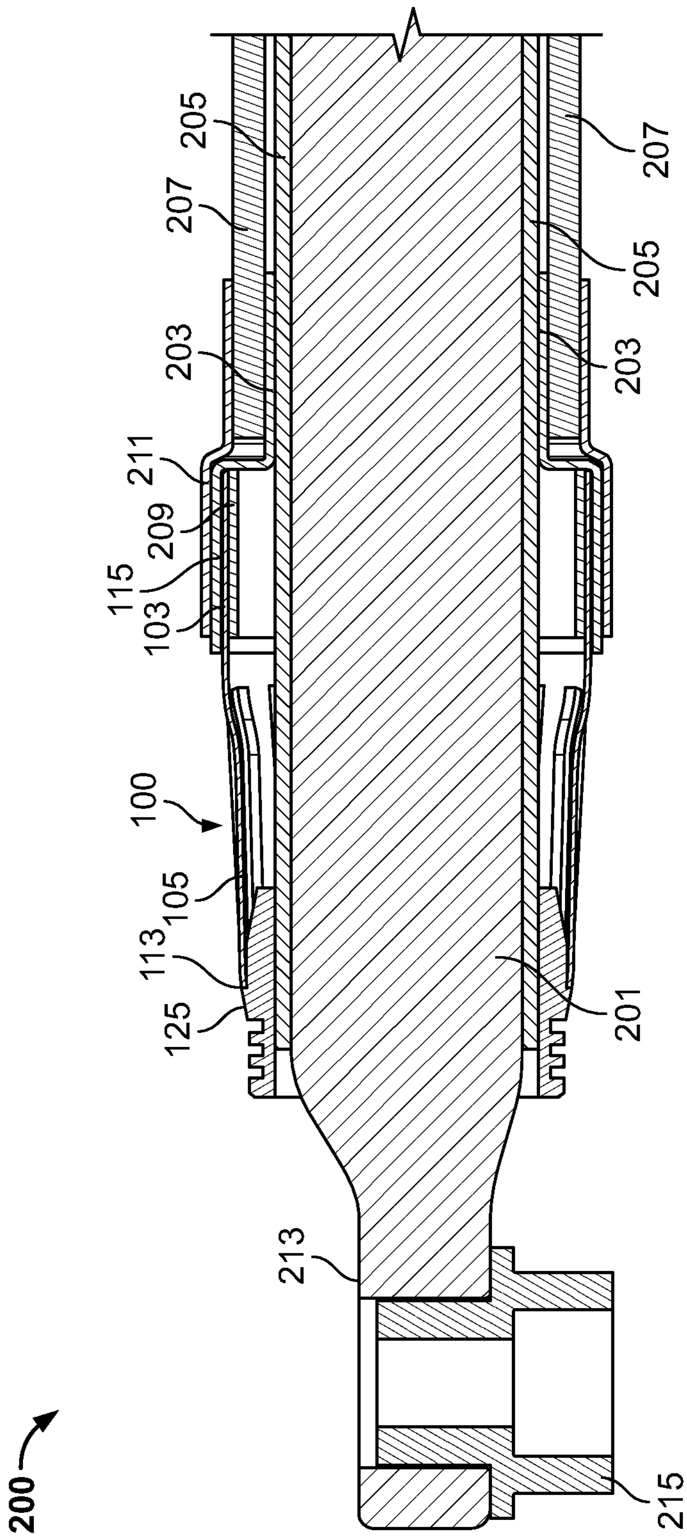
FIG. 2 is a sectional side view of a plug-in connector having a shielding spring contact according to an embodiment.

By inserting a cable 201 of a plug-in connector 200 according to the embodiment in FIG. 2, the shielding spring contact 100 can be positioned on the cable 201 of the plug-in connector 200. Via the cylindrical base portion 103, the shielding spring contact 100 can be connected by a crimp connection to a braid 203 of the cable 201 of the plug-in connector 200.

Figure 4:
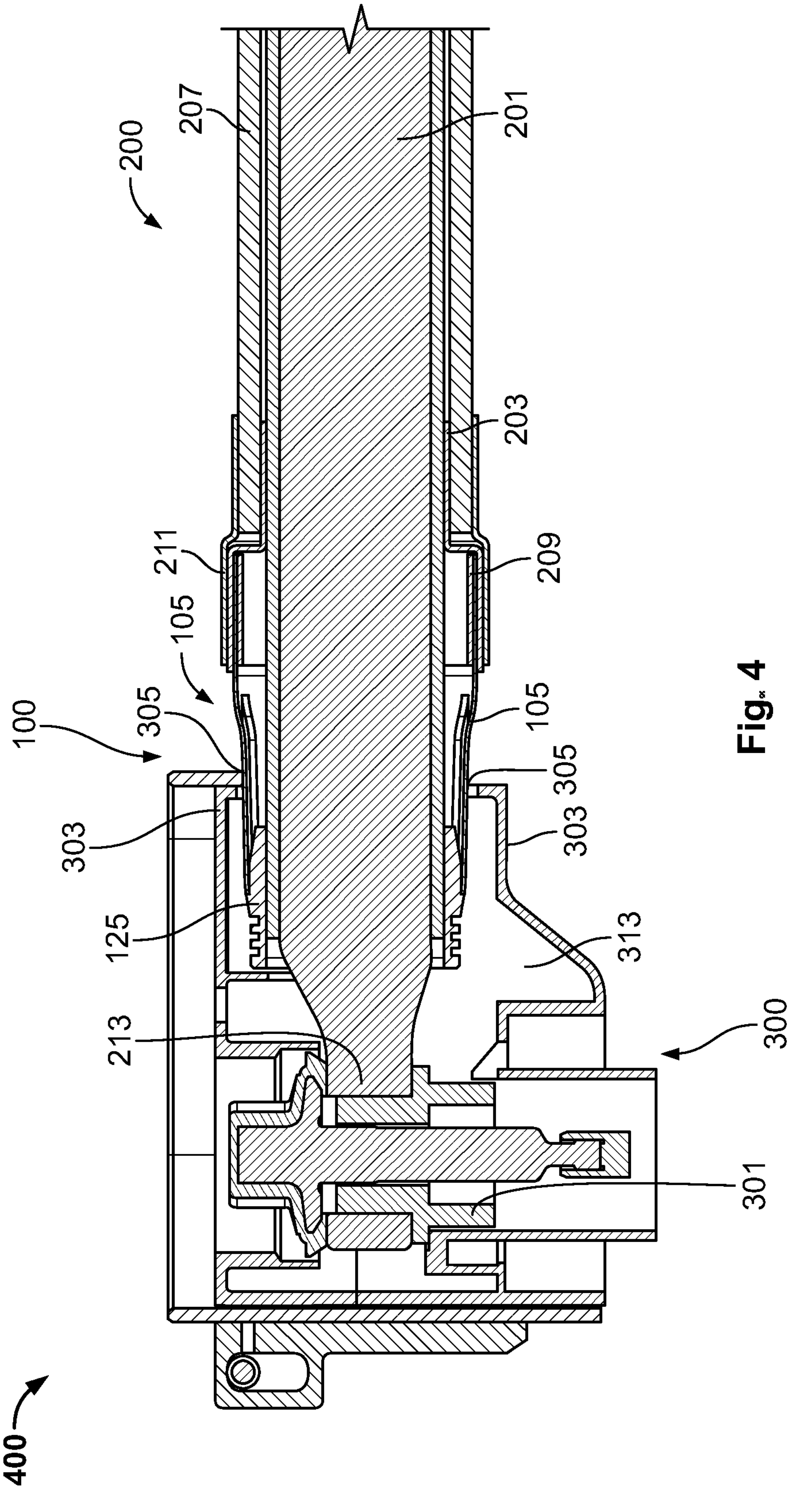
FIG. 4 is a sectional side view of a plug-in connector system including a plug-in connector and a cable shield connection.

When the shielding spring contact 100 is positioned on the cable 201 of the plug-in connector 200 and the plug-in connector 200 is inserted into an insertion opening 305 of an assembly housing 303 of a cable shield connection 300, connected to the plug-in connector 200, of a plug-in connector system 400 shown in FIG. 4, the shielding spring contact 100 can be electrically connected to the assembly housing 303 of the cable shield connection 300 via the conical shielding portion 105.

This electrical connection enables electric currents of the braid 203 of the cable 201 of the plug-in connector 200 to be diverted to the assembly housing 303 of the cable shield connection 300.

Figure 1B:
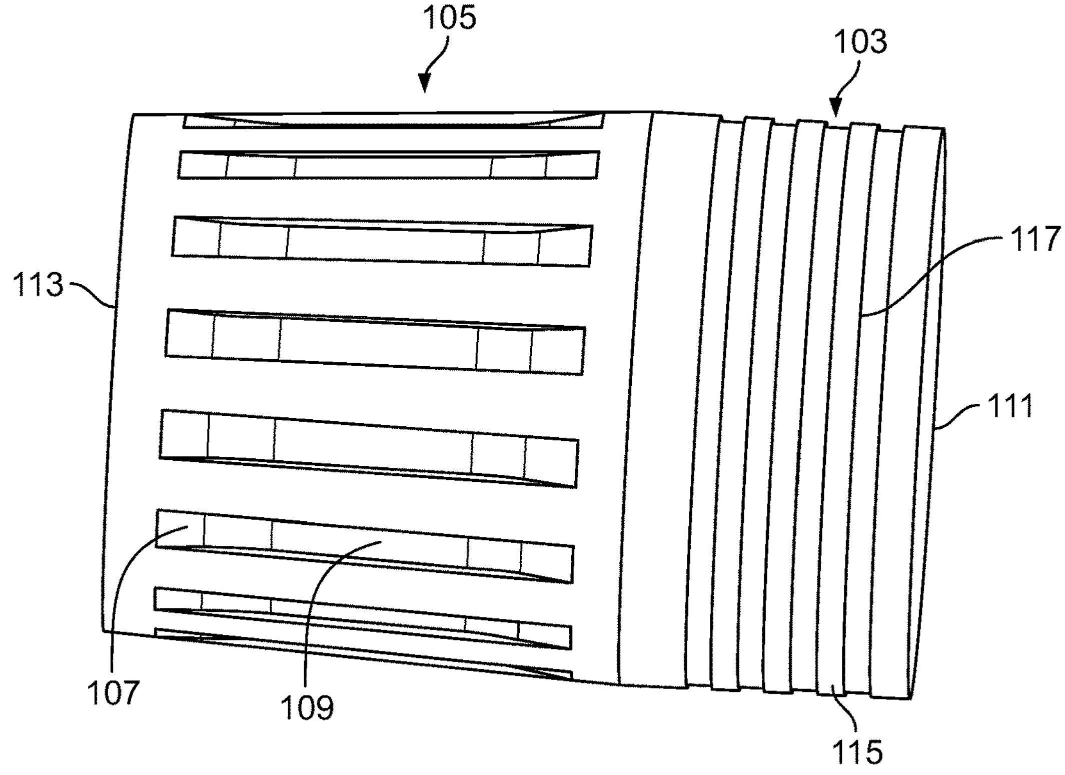
Figure 1C:
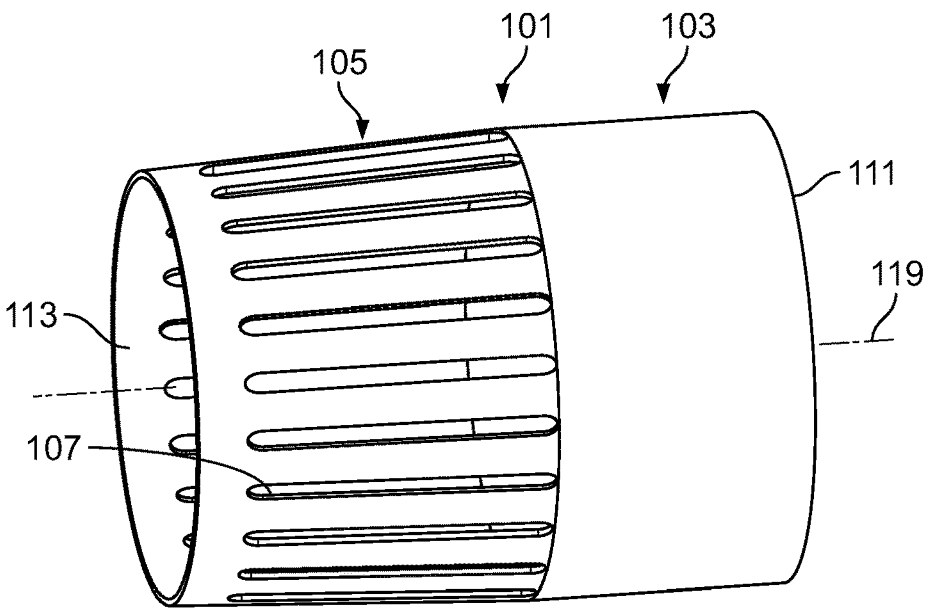

According to the invention, the shielding portion 105 has apertures 107, shown in FIGS. 1A-1C, which extend along the longitudinal axis 119. By the apertures 107, elastic deformability of the shielding portion 105 is achieved. This makes possible optimum electrical contacting between the shielding spring contact 100 and the assembly housing 303 of the cable shield connection 300.

According to the embodiment in FIG. 1A, the apertures 107 each have a bending element 109 that extends along the longitudinal direction 119 and is curved inwards. The bending elements 109 are bent into the interior of the sleeve-shaped main body 101. The bending elements 109 ensure substantial closure of an outer surface of the conical shielding portion 105, meeting the requirements of electromagnetic compatibility. In an embodiment, the apertures 107 may be punched.

According to the embodiment in FIG. 1B, the cylindrical base portion 103 has a plurality of grooves 117 formed on an outer cylindrical surface 115. The grooves 117 allow an improved crimp connection and electrical contacting with the braid 203 of the cable 201 of the plug-in connector 200.

According to the embodiment in FIG. 1C, the apertures 107 are designed as slots without bending elements 109.

By the apertures 107, elastic deformability of the conical shielding portion 105 is ensured. By the elastic deformability, the conical shielding portion 105 is configured, when deformed by an edge region of an insertion opening of an assembly housing of a cable shield connection, to exert a corresponding contact force on the respective edge region and thereby to improve electrical contacting between the shielding spring contact 100 and the assembly housing.

The number and arrangement of the apertures 107 can differ from those in the embodiments shown. The same applies to the length of the apertures 107. These too can differ from the illustrative embodiments in FIGS. 1A-1D. The arrangement and design, as well as the number of apertures 107, can be individually configured with reference to the desired elastic deformability of the shielding portion 105 and the contact force that can be applied by the latter when deformed.

According to the invention, the shielding spring contact 100 is manufactured from a metallic material. The shielding spring contact 100 may be manufactured from a copper alloy.

A thickness of the shielding spring contact 100 can be adapted to the respective application in accordance with the desired electrical conductivity and the desired robustness of the shielding spring contact 100.

The shielding spring contact 100 can be manufactured by a cold drawing method. Alternatively, the shielding spring contact 100 can be manufactured by a punching-bending process.

Figure 1D:
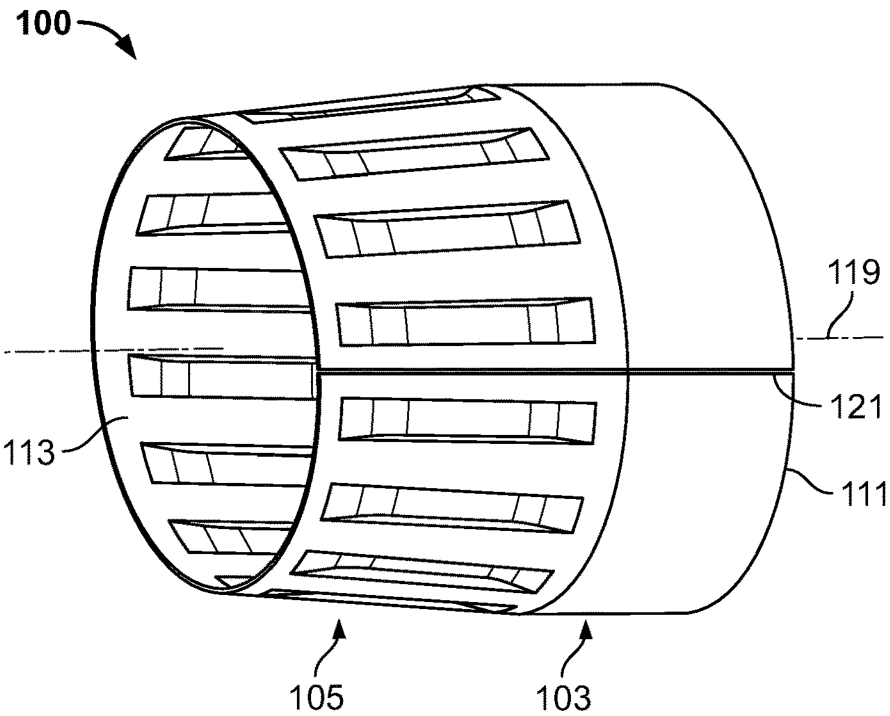

In the embodiment in FIG. 1D, the shielding spring contact 100 is manufactured by a bending process. In the embodiment shown, the shielding spring contact 100 has a bending slot 121 extending along the longitudinal axis 119.

Figure 1E:
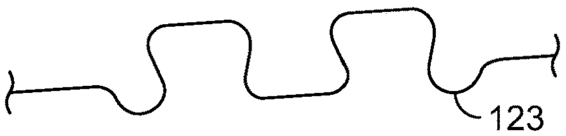

In the embodiment in FIG. 1E, which shows an enlarged depiction of a bending slot 121, the bending slot has a meandering shape and forms a jigsaw puzzle structure 123. By the jigsaw puzzle structure 123, a firm connection is made possible, and the bending slot 121 can be closed. The jigsaw puzzle structure 123 can also be held together by at least one or more spot welds.

The shielding spring contact 100 shown can be manufactured with different cross-sections. As a result, the shielding spring contact 100 can be provided for cables 201 of different cross-sections. Alternatively or in addition, a compensation of the cross-section can also be achieved by means of ferrules of different thickness.

FIG. 2 shows a schematic sectional illustration of a plug-in connector 200 having a shielding spring contact 100 according to one embodiment. The plug-in connector 200 shown has a cable 201 with an inner insulator 205, an outer insulator 207 and a braid 203 arranged between the insulators 205, 207. The inner and outer insulators 205, 207 are arranged concentrically with one another on the cable 201. The plug-in connector 200 furthermore has a connecting portion 213, by which an electrical connection of the plug-in connector 200 to a cable shield connection 300 of a plug-in connector system 400 is made possible.

In the embodiment shown, the connecting portion 213 has a screw element 215 for a screwed connection to the cable shield connection 300. However, this is only illustrative. There is no intention to limit the invention to a screw connection.

The plug-in connector 200 shown in FIG. 2 further comprises a shielding spring contact 100 according to the invention. The shielding spring contact 100 is arranged on the cable 201 of the plug-in connector 200. Using a crimp connection, the shielding spring contact 100 is fixed by the cylindrical base portion 103 to the braid 203 of the cable 201.

In the embodiment shown, the crimp connection is implemented by two ferrules 209, 211. In this case, an inner ferrule 209 is arranged between the cable 201 and the shielding spring contact 100. An outer ferrule 211, on the other hand, covers the outer cylindrical surface 115 of the base portion 103. In this arrangement, the braid 203 is arranged between the base portion 103 of the shielding spring contact 100 and the outer ferrule 211. In this case, the braid 203 contacts the outer cylindrical surface 115 of the base portion 103 of the shielding spring contact 100. Another alternative is an arrangement in which the braid 203 contacts an inner cylindrical surface of the base portion.

In the embodiment shown in FIG. 2, the shielding spring contact 100 has a stabilizing connecting element 125. The stabilizing connecting element 125 is of sleeve-shaped or collar-shaped design and is positioned on the cable 201. In the embodiment shown, the connecting element 125 is arranged at least partially in the passage opening 113 of the shielding spring contact 100, said opening being positioned in the conical shielding portion 105.

The conical shielding portion 105 thus rests at least partially on the connecting element 125. The connecting element 125 is thus arranged between the cable 201 and the shielding spring contact 100. By the connecting element 125, the shielding spring contact 100 can be fixed firmly on the cable 201 of the plug-in connector 200.

The connecting element 125 allows vibration-proofing of the shielding spring contact 100 on the cable 201 or on the plug-in connector 200. According to one embodiment, the connecting element 125 is manufactured from a plastics material. This allows electrical insulation of the shielding spring contact 100 with respect to the cable 201. In the embodiment shown, the connecting element 125 is arranged on the inner insulator 205 of the cable 201.

Figure 3:
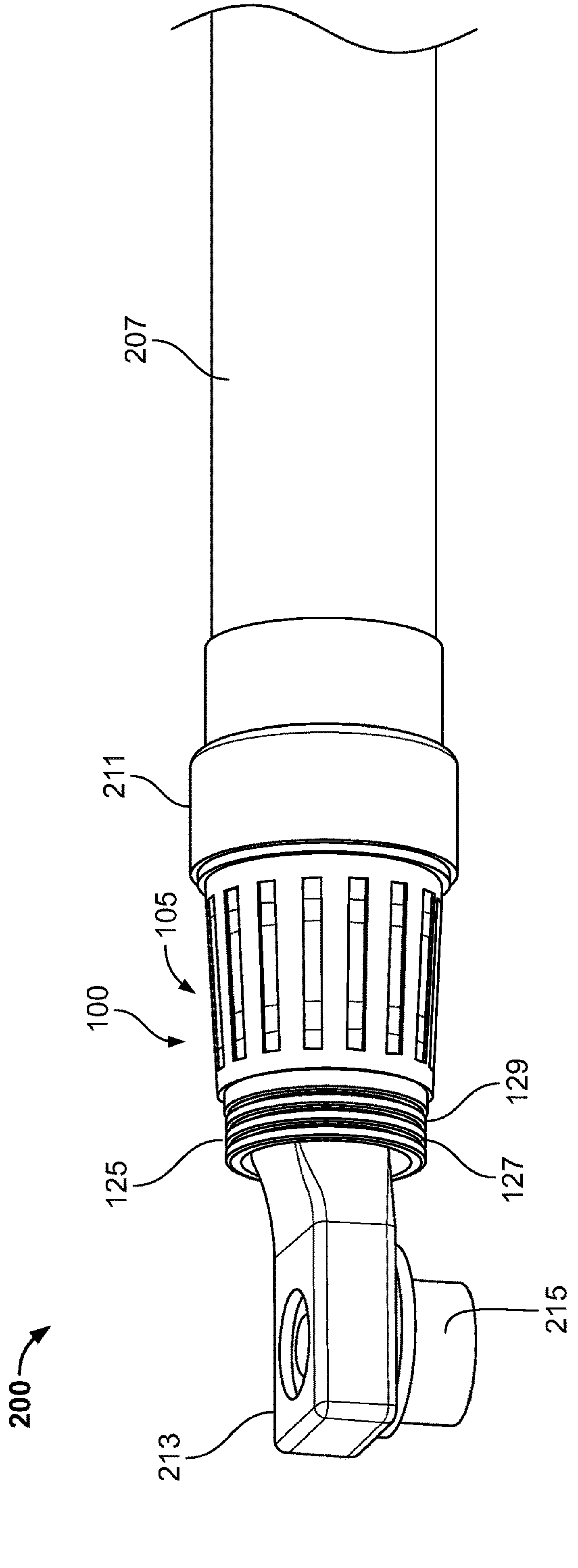
FIG. 3 is a perspective view of the plug-in connector of FIG. 2.

FIG. 3 shows a schematic perspective illustration of the plug-in connector 200 in FIG. 2. FIG. 3 illustrates how the outer ferrule 211 covers the outer cylindrical surface 115 of the cylindrical base portion 103. The outer ferrule 211 thus forms a secured closure of the crimp connection between the cylindrical base portion 103 of the shielding spring contact 100 and the braid 203 of the cable 201. It also illustrates the fact that the outer ferrule 211 rests on the outer insulator 207 of the cable 201.

FIG. 3 shows that the stabilizing connecting element 125 forms a closure of the shielding spring contact 100 at the end of the conical shielding portion 105. The connecting element 125 is arranged adjacent to the connecting portion 213 of the plug-in connector 200. In the embodiment shown, the stabilizing connecting element 125 has circumferential grooves 129 arranged on an outer surface 127. By the circumferential grooves 129, increased flexibility of the connecting element 125 is achieved. This is advantageous, in particular, for flexible connections between the plug-in connector 200 and a corresponding cable shield connection 300.

FIG. 4 shows a schematic sectional illustration of a plug-in connector system 400 having a plug-in connector 200 and a cable shield connection 300. In the illustration shown, the plug-in connector 200 is designed in accordance with the above-described embodiments and has a shielding spring contact 100 as described above.

The cable shield connection 300 shown in FIG. 4 has a connecting portion 301 for connection to the connecting portion 213 of the plug-in connector. The cable shield connection 300 furthermore has an assembly housing 303 with an internal space 313 and an insertion opening 305. The plug-in connector 200 can be inserted via the insertion opening 305 for connection to the cable shield connection 300.

The connecting portion 301 of the cable shield connection 300 is arranged in the internal space 313 of the assembly housing 303. Thus, for connection, the plug-in connector 200 is inserted through the insertion opening 305 into the internal space 313 of the assembly housing 303. The electrical and also mechanical connection between the plug-in connector 200 and the cable shield connection 300 via the connecting portion 213 of the plug-in connector 200 and the connecting portion 301 of the cable shield connection 300 thus takes place in the internal space 313 of the assembly housing 303.

The connection between the plug-in connector 200 and the cable shield connection 300 is thus protected from environmental influences by the assembly housing 303 of the cable shield connection 300.

In FIG. 4, the plug-in connector 200 has been inserted into the insertion opening 305 and connected via connecting portion 213 to the connecting portion 301 of the cable shield connection 300. Inserting the plug-in connector 200 into the internal space 313 of the assembly housing 303 via the insertion opening 305 of the assembly housing 303 connects the conical shielding portion 105 of the shielding spring contact 100 electrically to the assembly housing 303.

This electrical connection or contacting between the assembly housing 303 and the shielding spring contact 100 enables currents of the braid 203 of the cable 201 of the plug-in connector 200 to be diverted to the assembly housing 303 of the cable shield connection 300.

The elastic deformability of the conical shielding portion 105 enables the shielding portion 105 to exert a pressure on the assembly housing 303. This allows optimum electrical contacting.

The conical shape, in which the shielding portion 105 decreases in diameter from the base portion 103 towards the passage opening 113, enables contacting between the shielding portion 105 and an edge portion of the insertion opening 305 of various diameters to be achieved. The conical shape of the shielding portion 105 enables contacting with the edge portion of the insertion opening 305 over the entire length of the shielding portion 105 in the longitudinal direction 129.

By virtue of the rectilinear design of the surface of the conical shielding portion 105, the shielding portion 105 can be contacted at any desired locations and, by virtue of the elastic deformation by the contacting edge region 307, 309, is capable at any contact location of exerting a contact force sufficient for electrical contacting on the edge region 307, 309, contacting the shielding portion 105, of the insertion opening 305 of the assembly housing 303. Here, the intensity of the contact force depends only on the extent of elastic deformation but is independent of the respective contact point. The shielding spring contact 100 can thus be used for assembly housings 303 with insertion openings 305 of different sizes while achieving the same performance. The only prerequisite is that a diameter of the insertion opening 305 is smaller than a maximum diameter of the shielding portion 105.

This makes it possible to eliminate the need for contacting between the shielding portion 105 and the assembly housing 303 to take place at one contact point provided for this purpose; instead, contacting can take place at any desired points on the conical shielding portion 105.

At each contact point, the optimum contact pressure required for optimum electrical contacting can in this case be achieved by the elastic deformation of the conical shielding portion 105. The elastic deformation of the conical shielding portion 105 can be achieved by inserting the plug-in connector 200 so far into the insertion opening 305 of the assembly housing 303 that contacting is brought about between the edge region 307, 309 of the insertion opening 305 of the assembly housing 303 and the conical shielding portion 105. This assumes that a cross-section or diameter of the insertion opening 305 of the assembly housing 303 is smaller than a maximum cross-section or diameter of the conical shielding portion 105.

Figure 5:
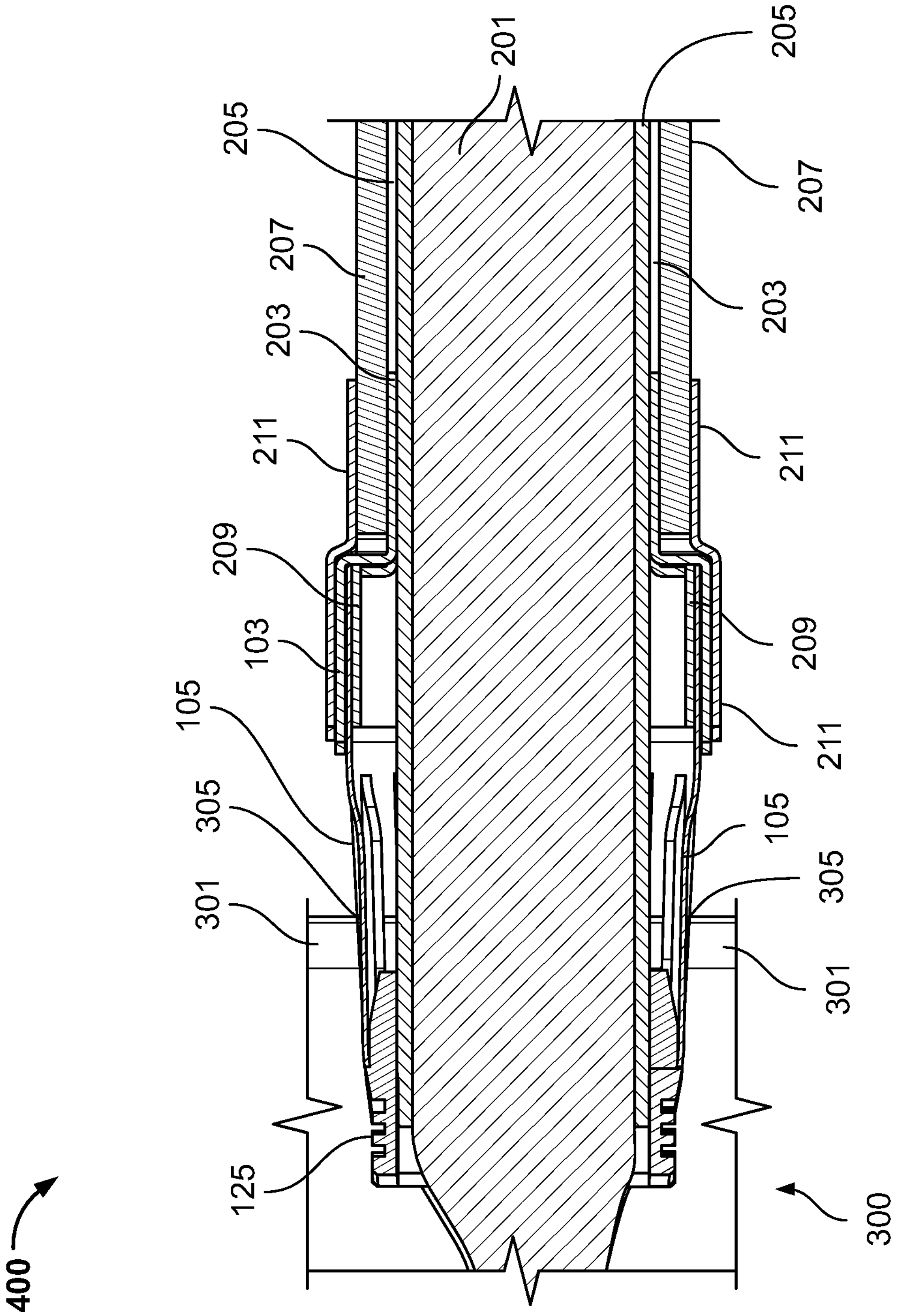
FIG. 5 is a sectional side view of the plug-in connector system of FIG. 4.

FIG. 5 shows a further schematic sectional illustration of the plug-in connector system in FIG. 4. FIG. 5 shows an enlarged illustration of the contacting of the conical shielding portion 105 of the shielding spring contact 100 arranged on the cable 201 of the plug-in connector 200 by the edge region 307, 309 of the insertion opening 305 of the assembly housing 303.

Insertion of the plug-in connector 200 into the insertion opening 305 in the longitudinal direction 129 enables contacting. The further the plug-in connector 200 is inserted, the further the conical shielding portion 105 of the shielding spring contact 100 can be pressed in or elastically deformed by the edge region 307, 309 of the insertion opening 305 of the assembly housing 303. The contact force that is correspondingly exerted on the edge region 307, 309 by the deformed shielding portion 105 can be correspondingly increased.

Here, the elastic deformation or elastic component of the deformation has the effect that a contact force is exerted by the conical shielding portion 105 on the edge region 307, 309 of the insertion opening 305 of the assembly housing 303. The greater the contact pressure by the conical shielding spring contact 100, the better is the electrical contacting between the shielding spring contact 100 and the assembly housing 303, and the better is the capacity for diverting the current of the braid 203 of the cable 201 of the plug-in connector 200 to the assembly housing 303 of the cable shield connection 300.

FIG. 6A-6D shows a schematic sectional illustration of an assembly housing 303 of a cable shield connection 300 according to several embodiments. In particular, the diagrams show edge regions 307, 309 of the insertion opening 305 of the assembly housing 303. FIGS. 6A to 6D each show sectional illustrations of the insertion opening 305. Thus only parts of the insertion opening 305 and of the associated edge region 307, 309 are shown in FIGS. 6A to 6D. FIGS. 6A1, 6B1, and 6C1 each show enlarged illustrations of the edge regions 307, 309 of the embodiments of the assembly housings 303 in FIGS. 6A, 6B, and 6C respectively.

Figures 6A, 6B, 6C, 6D:
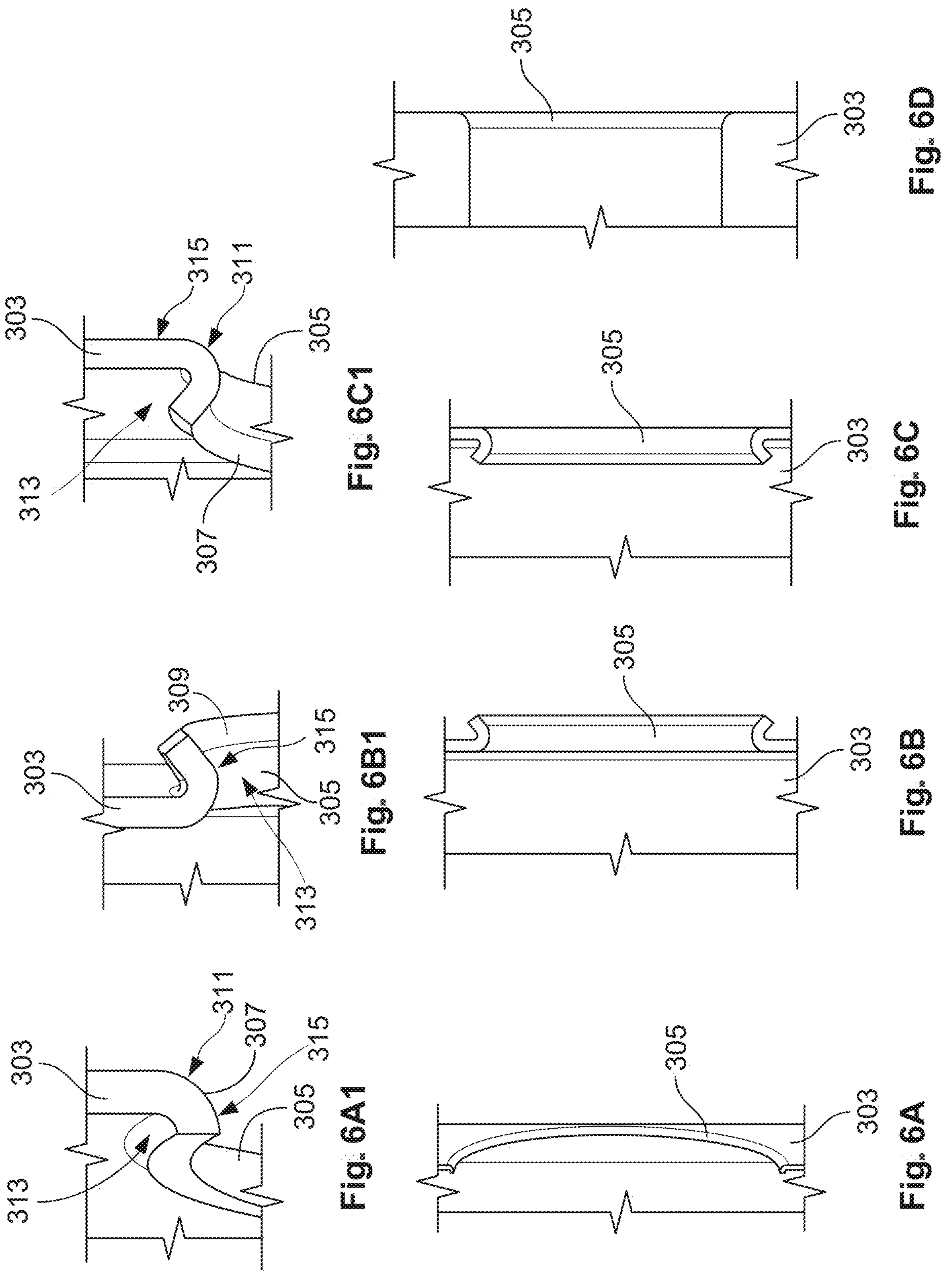
FIGS. 6A-6D are schematic sectional illustrations of an assembly housing of a cable shield connection according to several embodiments.

In the embodiments in FIGS. 6A to 6C, the assembly housing 303 has a bent or punched housing structure. In particular, the assembly housing 303 can be manufactured from a sheet-metal material and be given the desired configuration by punching and/or bending processes.

In the embodiment in FIG. 6D, by contrast, the assembly housing 303 has a robust solid-body structure. This can be achieved by a casting method or a milling method, for example. For this purpose, the assembly housing 303 can be formed from a metallic material that is correspondingly suitable for a casting and/or milling method.

FIGS. 6A1, 6B1, and 6C1 show three different embodiments of the edge region 307, 309 of the insertion opening 305 of the assembly housing 303.

In FIG. 6A1, the edge region 307 is designed as an edge region 307 that is bent in. Here, the bent-in edge region 307 is formed into the internal space 313 of the assembly housing 303. The edge region 307 thus has a rounded region 311 which faces outwards. The outward-facing rounded region 311 enables the plug-in connector 100 to be inserted without problems into the insertion opening 305. During this process, the shielding spring contact 100 slides over the conical shielding portion 105 along the outward-facing rounded region 311 and into the appropriate contact position. In the embodiment shown, the bent-in edge region 307 curves into the internal space 313 of the assembly housing 303 at an angle less than or equal to 90° with respect to an outer surface 315 of the assembly housing 303.

In FIG. 6C1, the insertion opening 305 likewise has a bent-in edge region 307, which extends into the internal space 313 of the assembly housing 303. The bent-in edge region 307 once again has an outward-facing rounded region 311, via which the shielding spring contact 100 can be inserted into the internal space 313 of the assembly housing 303 by the conical shielding portion 105 through the insertion opening 305. In the embodiment shown, the bent-in edge region 307 curves into the internal space of the assembly housing 303 at an angle of more than 90° with respect to the outer surface 315 of the assembly housing 303.

In the embodiment in FIG. 6B1, in contrast, the insertion opening 305 of the assembly housing 303 has an edge region 309 which is bent outwards. In contrast to the bent-in edge region 307 of the embodiments in FIGS. 6A1 and 6C1, the bent-out edge region 309 is bent away from the internal region 313 of the assembly housing 303. The edge region 309 thus has a rounded region 315 which faces into the internal region 313 of the assembly housing 303.

The bent-in and bent-out edge regions 307, 309 of the embodiments in FIGS. 6A1, 6B1, and 6C1 can be produced by a bending process or a punching process.

In the embodiment in FIG. 6D, the edge region 307, 309 shown neither curves into the internal space 313 of the assembly housing 303, as in the embodiments in FIGS. 6A1 and 6C1, nor away from the internal space 313, as in the embodiment in FIG. 6B1. However, the edge region 307, 309 has a rounded region 311 facing outwards, that is to say away from the internal space 313.

In the embodiments of the plug-in connector 200 which are described above with reference to FIGS. 2 to 5, the shielding spring contact 100 formed on the plug-in connector 200 can be designed in accordance with all the embodiments illustrated in FIGS. 1A-1E.

In an embodiment, the sleeve-shaped main body 101 of the shielding spring contact 100 has a round cross-section in accordance with the conventional cross-sections of commercially available cables. The conical shielding portion 105 thus likewise has a round cross-section. According to one embodiment, the insertion opening 305 of the assembly housing 303 likewise has a round cross-section matching the cross-section of the shielding portion 105.

The embodiments of the shielding spring contact 100 can also be combined with one another. In an embodiment, the shielding spring contact 100 can also be formed on the cable 201 of the plug-in connector 200, without a connecting element 125.

The shielding spring contact 100 according to the invention can be used for plug-in connectors 200 having cables 201 with many different cable cross-sections.

The corresponding plug-in connectors 200 or plug-in connector systems 400 can be used for a power line, e.g. for high-current connections. The plug-in connectors 200 or plug-in connector systems 400 can also be used for data connections for transferring data.

The shielding spring contact 100, the plug-in connector 200, the cable shield connection 300 and the plug-in connector system 400 can be used in many different areas of application. In an embodiment, the components mentioned can be used in the vehicle sector.

The sleeve-shaped structure makes the shielding spring contact 100 simple to manufacture and simple to fix on the cable 201 of the plug-in connector 200 by insertion of the cable 201 into the passage openings 113. The conical shielding portion 105 enables contact to be made with the assembly housing 303 of a cable shield connection 300 by inserting the plug-in connector 200 into an insertion opening 305 of the assembly housing 303.

The contacting enables the current of the braid 203 of the cable 201 to be diverted to the assembly housing 303. The cylindrical base portion 103 enables the shielding spring contact 100 to be connected to the braid 203 and thus fixed on the cable 201 by a crimp connection that is technically easy to implement.

The elastic flexibility of the conical shielding portion 105 enables optimized contacting with the assembly housing 303. Here, the flexibility enables contacting between the shielding portion 105 and assembly housings 303 that have insertion openings 305 with cross-sections of different sizes. Here, the flexibility of the shielding portion 105 ensures a constant contact force of the shielding portion 105 against the edges of the insertion opening 305 of the assembly housing 303, thereby enabling optimum contacting.

What is claimed is:

1. A shielding spring contact for an electrical plug-in connector for an electrical plug-in connector system, comprising:

a sleeve-shaped main body having a cylindrical base portion, a conical shielding portion extending from the cylindrical base portion, and a plurality of passage openings by which the shielding spring contact is arranged on a cable of the electrical plug-in connector, one of the passage openings is at an end of the cylindrical base portion and another of the passage openings is at an end of the conical shielding portion, the shielding spring contact is connectable to a braid of the cable via the cylindrical base portion by a crimp connection, the conical shielding portion has a plurality of apertures extending along a longitudinal direction of the shielding spring contact and is elastically deformable, the shielding spring contact is contactable with an assembly housing of a cable shield connection of the plug-in connector system via the conical shielding portion, a current of the braid can be diverted to the assembly housing via contact between the conical shielding portion and the assembly housing.

2. The shielding spring contact of claim 1, wherein the cylindrical base portion has a groove arranged circumferentially on an outer cylindrical surface of the cylindrical base portion.

3. The shielding spring contact of claim 1, wherein the apertures are formed as a plurality of slots.

4. The shielding spring contact of claim 1, wherein the apertures have a plurality of bending elements extending in the longitudinal direction and extending radially inward.

5. The shielding spring contact of claim 1, wherein the apertures are punched.

6. The shielding spring contact of claim 1, further comprising a stabilizing connecting element that is collar-shaped, the stabilizing connecting element is formed on one of the passage openings of the sleeve-shaped main body.

7. The shielding spring contact of claim 6, wherein the stabilizing connecting element is arranged on the conical shielding portion and fixes the shielding spring contact on the cable.

8. The shielding spring contact of claim 7, wherein the stabilizing connecting element is arranged at least partially in the one of the passage openings.

9. The shielding spring contact of claim 8, wherein the conical shielding portion rests at least partially on the stabilizing connecting element.

10. The shielding spring contact of claim 6, wherein the stabilizing connecting element is formed from a plastic material.

11. A plug-in connector for a plug-in connector system, comprising:

a cable having a connecting portion connecting to a cable shield connection of the plug-in connector system; and a shielding spring contact arranged on the cable, the shielding spring contact including a sleeve-shaped main body having a cylindrical base portion, a conical shielding portion extending from the cylindrical base portion, and a plurality of passage openings by which the shielding spring contact is arranged on the cable, one of the passage openings is at an end of the cylindrical base portion and another of the passage openings is at an end of the conical shielding portion, the shielding spring contact is connectable to a braid of the cable via the cylindrical base portion by a crimp connection, the conical shielding portion has a plurality of apertures extending along a longitudinal direction of the shielding spring contact and is elastically deformable, the shielding spring contact is contactable with an assembly housing of the cable shield connection via the conical shielding portion, a current of the braid can be diverted to the assembly housing via contact between the conical shielding portion and the assembly housing.

12. The plug-in connector of claim 11, wherein the shielding spring contact is crimped to the braid of the cable by an inner ferrule and/or an outer ferrule.

13. The plug-in connector of claim 12, wherein the inner ferrule is arranged between the cable and the shielding spring contact.

14. The plug-in connector of claim 12, wherein the outer ferrule covers an outer cylindrical surface of the cylindrical base portion.

15. A cable shield connection for a plug-in connector system, comprising:

a connecting portion connecting with a connecting portion of a plug-in connector of the plug-in connector system; and an assembly housing having an insertion opening receiving the plug-in connector and an internal space, the connecting portion of the cable shield connection is arranged in the internal space of the assembly housing, the insertion opening contacts a conical shielding portion of a shielding spring contact when the plug-in connector is inserted, the shielding spring contact is positioned on a cable of the plug-in connector, the conical shielding portion has a plurality of apertures extending along a longitudinal direction of the shielding spring contact and is elastically deformable, each aperture has a bending element bent into an interior of a sleeve-shaped main body of the shielding spring contact.

16. The cable shield connection of claim 15, wherein the assembly housing has a bent or punched sheet-metal structure.

17. The cable shield connection of claim 15, wherein the assembly housing has a milled or cast housing structure.

18. The cable shield connection of claim 15, wherein the insertion opening has a circular cross-section.

19. A plug-in connector system, comprising:

a plug-in connector including a cable and a shielding spring contact arranged on the cable, the cable has a connecting portion, the shielding spring contact including a sleeve-shaped main body having a cylindrical base portion, a conical shielding portion extending from the cylindrical base portion, and a plurality of passage openings by which the shielding spring contact is arranged on the cable, one of the passage openings is at an end of the cylindrical base portion and another of the passage openings is at an end of the conical shielding portion, the shielding spring contact is connectable to a braid of the cable via the cylindrical base portion by a crimp connection, the conical shielding portion has a plurality of apertures extending along a longitudinal direction of the shielding spring contact and is elastically deformable; and a cable shield connection including a connecting portion and an assembly housing, the connecting portion of the cable shield connection connects with the connecting portion of the plug-in connector, the assembly housing has an insertion opening receiving the plug-in connector, the insertion opening contacts the conical shielding portion when the plug-in connector is inserted, a current of the braid can be diverted to the assembly housing via contact between the conical shielding portion and the assembly housing.

* * * * *